US012087237B2

(12) United States Patent
Lee et al.

(10) Patent No.: US 12,087,237 B2
(45) Date of Patent: *Sep. 10, 2024

(54) DISPLAY DEVICE AND METHOD OF DRIVING THE SAME

(71) Applicant: Samsung Display Co., Ltd., Yongin-si (KR)

(72) Inventors: Jaehoon Lee, Seoul (KR); Kyoungho Lim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,904

(22) Filed: Apr. 10, 2023

(65) Prior Publication Data

US 2023/0245625 A1 Aug. 3, 2023

Related U.S. Application Data

(63) Continuation of application No. 17/377,239, filed on Jul. 15, 2021, now Pat. No. 11,657,765.

(30) Foreign Application Priority Data

Sep. 18, 2020 (KR) ........................ 10-2020-0120255

(51) Int. Cl.
*G09G 3/3275* (2016.01)

(52) U.S. Cl.
CPC ... *G09G 3/3275* (2013.01); *G09G 2310/0272* (2013.01); *G09G 2320/046* (2013.01)

(58) Field of Classification Search
CPC ......... G09G 3/3275; G09G 2310/0272; G09G 2320/046; G09G 3/007; G09G 2340/0464;

(Continued)

(56) References Cited

U.S. PATENT DOCUMENTS 10,068,537 B2 9/2018 Lee et al.
10,147,401 B2 * 12/2018 Lee ...................... G09G 3/3233

(Continued)

FOREIGN PATENT DOCUMENTS

EP 3624107 7/2020
KR 10-1182779 9/2012

(Continued)

OTHER PUBLICATIONS

Non-Final Office Action dated Jun. 15, 2022, in U.S. Appl. No. 17/377,239.

(Continued)

*Primary Examiner* — Ibrahim A Khan

(74) *Attorney, Agent, or Firm* — CANTOR COLBURN LLP

(57) ABSTRACT

A display device including a display panel to display an image, a panel driver to drive the display panel, and a controller to control a driving of the panel driver. The controller includes a first circuit to receive frame data during an active period in synchronization with a vertical synchronization signal determining a start time point of a frame having the active period and a variable blank period, to shift a position of the frame data in response to a shift start signal to generate shift data, and to provide the shift data to the panel driver. A number of active periods of the vertical synchronization signal included in one period of the shift start signal differs from the number of active periods of the vertical synchronization signal included in another period of the shift start signal.

27 Claims, 13 Drawing Sheets

(58) Field of Classification Search
CPC ......... G09G 3/3225; G09G 2340/0435; G09G 3/3208; G09G 2320/0257
See application file for complete search history.

(56) References Cited

U.S. PATENT DOCUMENTS

| | | | | |
|---|---|---|---|---|
| 10,803,800 | B2 | 10/2020 | An | |
| 10,909,935 | B2 | 2/2021 | Koo et al. | |
| 10,991,321 | B1 * | 4/2021 | Chen | G09G 3/3426 |
| 11,043,184 | B2 | 6/2021 | An et al. | |
| 2011/0043551 | A1 | 2/2011 | Kikuta | |
| 2011/0169789 | A1 * | 7/2011 | Yamaguchi | G09G 3/3677 345/204 |
| 2015/0029236 | A1 * | 1/2015 | De Greef | G09G 3/3406 345/102 |
| 2016/0321973 | A1 * | 11/2016 | Chun | G09G 3/007 |
| 2017/0084235 | A1 * | 3/2017 | Yeo | G09G 3/3607 |
| 2017/0193971 | A1 * | 7/2017 | Bi | G09G 5/18 |
| 2018/0174551 | A1 * | 6/2018 | Ansari | G09G 5/12 |
| 2019/0164486 | A1 * | 5/2019 | An | G09G 3/3233 |
| 2019/0206348 | A1 * | 7/2019 | Ahn | G09G 3/3648 |
| 2019/0253662 | A1 * | 8/2019 | Kim | H04N 7/0127 |
| 2019/0378459 | A1 * | 12/2019 | Kim | G09G 3/3291 |
| 2020/0082781 | A1 | 3/2020 | An et al. | |
| 2020/0211430 | A1 * | 7/2020 | Kim | G09G 3/3233 |
| 2020/0226992 | A1 | 7/2020 | Lee et al. | |

FOREIGN PATENT DOCUMENTS

| | | |
|---|---|---|
| KR | 10-2015-0102134 | 9/2015 |
| KR | 10-2019-0062652 | 6/2019 |
| KR | 10-2019-0126676 | 11/2019 |
| KR | 10-2020-0029101 | 3/2020 |

OTHER PUBLICATIONS

Final Office Action dated Oct. 20, 2022, in U.S. Appl. No. 17/377,239.
Notice of Allowance dated Jan. 13, 2023, in U.S. Appl. No. 17/377,239.

* cited by examiner

DISPLAY DEVICE AND METHOD OF DRIVING THE SAME

CROSS-REFERENCE TO RELATED APPLICATION

This application is a Continuation of U.S. patent application Ser. No. 17/377,239, filed on Jul. 15, 2021, which claims priority from and the benefit of Korean Patent Application No. 10-2020-0120255, filed on Sep. 18, 2020, which are hereby incorporated by reference for all purposes as if fully set forth herein.

BACKGROUND

Field

Embodiments of the invention relate generally to a display device and, more specifically to a display device capable of preventing image sticking and a method of driving the display device.

Discussion of the Background

As display devices, an organic light emitting display device, a liquid crystal display device, a plasma display device, and the like are being used.

Among them, the organic light emitting display device has advantages, such as high brightness, ultra-thin thickness, etc., since the organic light emitting display device employs a self-emissive element that allows an organic light emitting layer to emit a light using a recombination of electrons and holes.

The above information disclosed in this Background section is only for understanding of the background of the inventive concepts, and, therefore, it may contain information that does not constitute prior art.

SUMMARY

Applicant recognized that when an organic light emitting display device is driven for a long time in the same pattern, one or more light emitting elements may be burned in due to the increase of current stress, and as a result, image sticking occurs in areas where fixed patterns or logos are displayed for a long time.

Display devices constructed according to the principles and embodiments of the invention and illustrative methods of driving the same are capable of effectively preventing image sticking and improving image burn-in. For example, image shifting may be employed in which the display image is periodically shifted in a display device supporting a variable frequency mode.

Additional features of the inventive concepts will be set forth in the description which follows, and in part will be apparent from the description, or may be learned by practice of the inventive concepts.

According to one aspect of the invention, a display device includes: a display panel to display an image, a panel driver to drive the display panel, and a controller to control a driving of the panel driver. The controller includes a first circuit to receive frame data during an active period in synchronization with a vertical synchronization signal determining a start time point of a frame having the active period and a variable blank period, to shift a position of the frame data in response to a shift start signal to generate shift data, and to provides the shift data to the panel driver. A number of active periods of the vertical synchronization signal included in one period of the shift start signal differs from the number of active periods of the vertical synchronization signal included in another period of the shift start signal.

The controller may further include a second circuit to count the variable blank period based on a reference clock to generate a count value of the frame, to compare a cumulative value obtained by cumulating the count value with a predetermined reference value, and to determine an activation time point of the shift start signal according to the compared result.

The second circuit may include a shift determiner including a counter to count a number of occurrences of the reference clock during the variable blank period to output a first count value and a calculator to add a pre-stored second count value of the active period and the first count value to calculate the count value.

The active period may have a substantially constant duration every frame, and the variable blank period may have a variable duration.

The controller may be configured to receive the frame data in response to a data enable signal, and the counter may be configured to count a non-active period of the data enable signal to generate the first count value.

The controller may further include a first memory in which the second count value is stored.

The shift determiner may further include an adder to add the count value and a previous cumulative value to output the cumulative value and a comparator to compare the cumulative value with the reference value and to output a shift control signal according to the compared result.

The controller may further include a second memory configured to receive the cumulative value output from the adder and to update the previous cumulative value to the cumulative value.

The shift determiner may further include a signal generator to receive the shift control signal to control the activation time point of the shift start signal and to provide the shift start signal to the image processor.

The shift determiner may further include a preliminary comparator to compare the count value with the reference value.

The preliminary comparator may be configured to provide the count value to the adder when the count value is smaller than the reference value and to output a pre-shift control signal when the count value is greater than the reference value.

The shift determiner may further include a signal generator to receive the pre-shift control signal to control the activation time point of the shift start signal and to provide the shift start signal to the image processor.

The display panel may include a plurality of pixels each comprising a light emitting element.

The first circuit may include an image processor including a shift processor to is determine a pixel shift amount based on shift setting information and to generate initial shift data obtained by shifting the frame data according to the pixel shift amount and a shift direction and a data compensator to compensate for the initial shift data to generate the shift data.

The data compensator may include an area setter to set first and second compensation areas according to the pixel shift amount and the shift direction, a first sub-compensator to scale up first sub-shift data corresponding to the first compensation area among the initial shift data to generate first compensation data, and a second sub-compensator to scale down second sub-shift data corresponding to the second compensation area among the initial shift data to generate second compensation data.

According to one aspect of the invention, a method of driving a display device, the method includes the steps of: receiving frame data during an active period in synchronization with a vertical synchronization signal determining a start time point of a frame having the active period and a variable blank period, setting a period of a shift start signal based upon the variable blank period, shifting the frame data in response to the shift start signal to generate shift data, converting the shift data to a data signal, and displaying an image using the data signal. A number of active periods of the vertical synchronization signal included in one period of the shift start signal differs from the number of active periods of the vertical synchronization signal included in another period of the shift start signal.

The step of setting the period of the shift start signal may include the steps of counting the variable blank period based on a reference clock to generate a count value of the frame, comparing a cumulative value obtained by cumulating the count value with a predetermined reference value, and determining an activation time point of the shift start signal according to the compared result.

The step of determining the activation time point of the shift start signal may include the steps of generating the count value of the frame, adding the count value and a pre-stored previous cumulative value to generate the cumulative value, comparing the cumulative value with the reference value to output a shift control signal according to the compares result, and activating the shift start signal in response to the shift control signal.

The step of calculating the count value may further include the steps of counting a number of occurrences of the reference clock during the variable blank period to output a first count value and adding a pre-stored second count value of the active period and the first count value to calculate the count value.

The active period may have a substantially constant duration every frame, and the variable blank period may have a variable duration.

The variable blank period may be generated after the active period in the frame is generated.

The step of receiving the frame data may include receiving the frame data in response to a data enable signal, and the step of outputting the first count value may include counting a non-active period of the data enable signal to generate the first count value.

The method may further include the step of receiving the count value and updating the previous cumulative value to the cumulative value.

The method may further include the step of comparing the count value with the reference value prior to the outputting of the cumulative value.

The step of comparing of the count value with the reference value may include the steps of adding the count value and the previous cumulative value when the count value is smaller than the reference value and outputting a pre-shift control signal when the count value is greater than the reference value.

The method may further include the step of activating the shift start signal in response to the pre-shift control signal.

The step of generating of the shift data may include the steps of determining a pixel shift amount based on shift setting information to generate initial shift data obtained by shifting the frame data according to the pixel shift amount and a shift direction and compensating for the initial shift data to generate the shift data.

The step of compensating for the initial shift data may include the steps of setting first and second compensation areas according to the pixel shift amount and the shift direction, scaling up first sub-shift data corresponding to the first compensation area among the initial shift data to generate first compensation data, and scaling down second sub-shift data corresponding to the second compensation area among the initial shift data to generate second compensation data.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
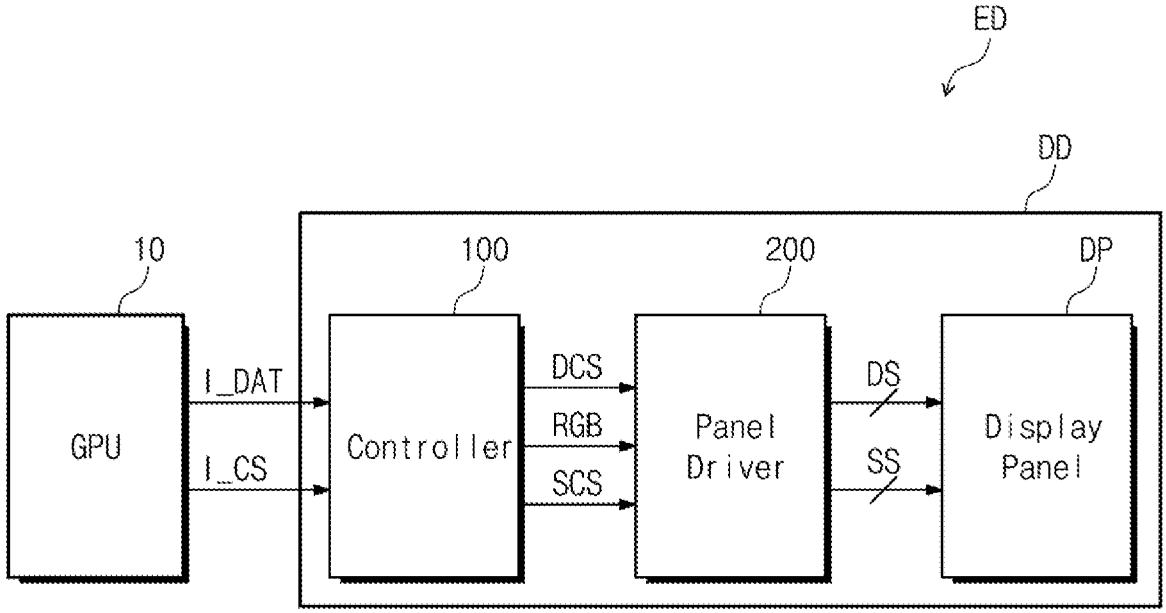
FIG. 1 is a block diagram of an embodiment of an electronic apparatus constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
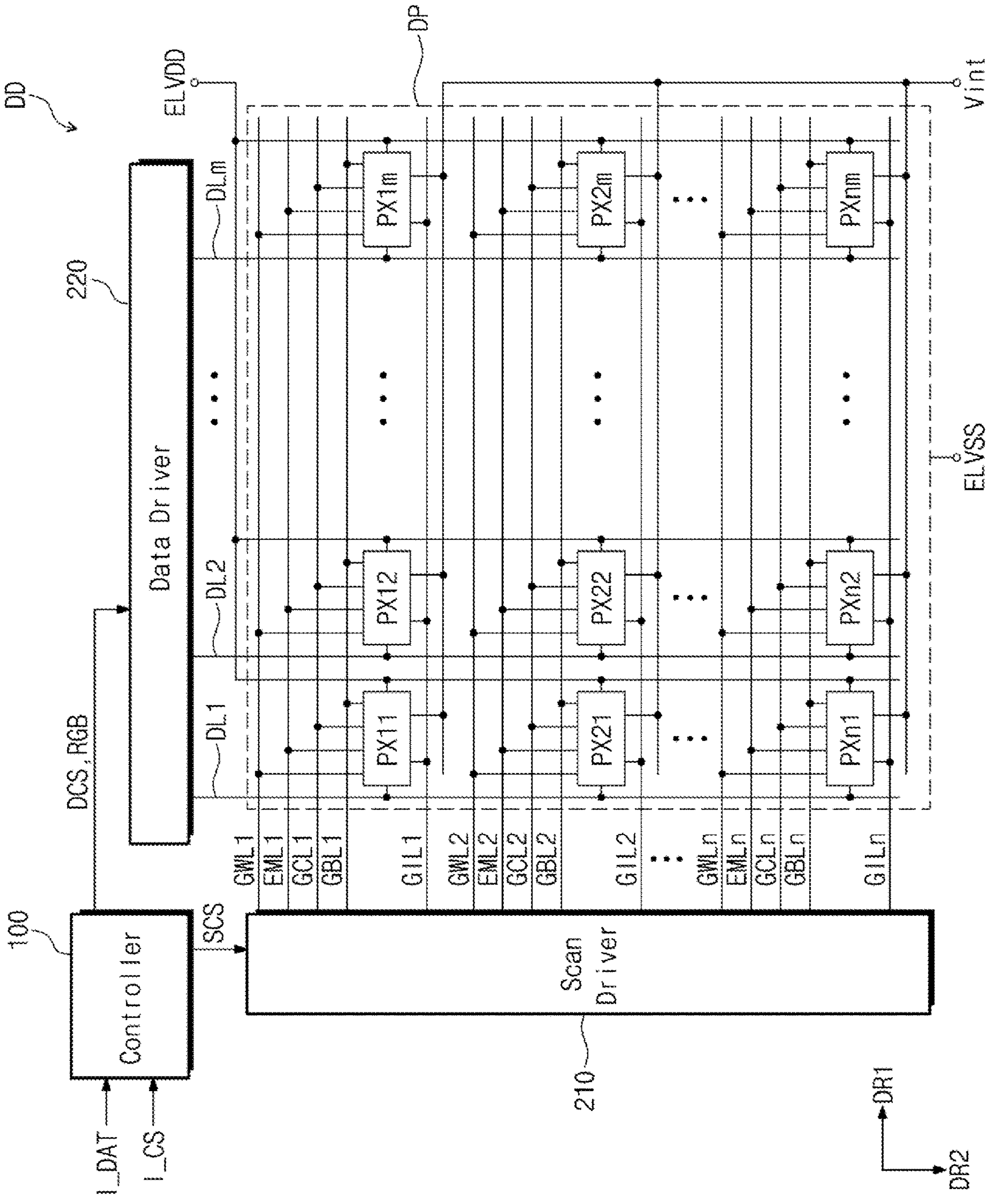
FIG. 2 is a block diagram of an embodiment of the display device of FIG. 1.
Figure 3:
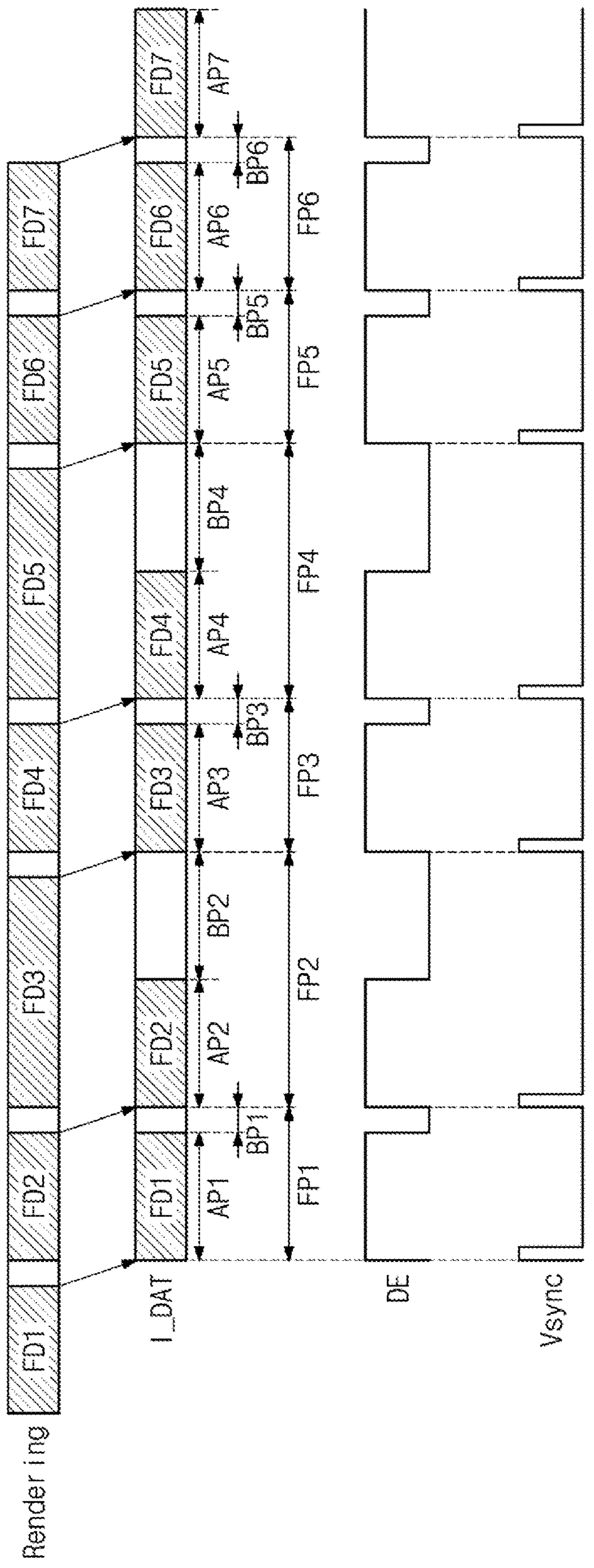
FIG. 3 is a waveform diagram showing illustrative frame data input to the display device of FIG. 2 in a variable frequency mode.
Figure 4:
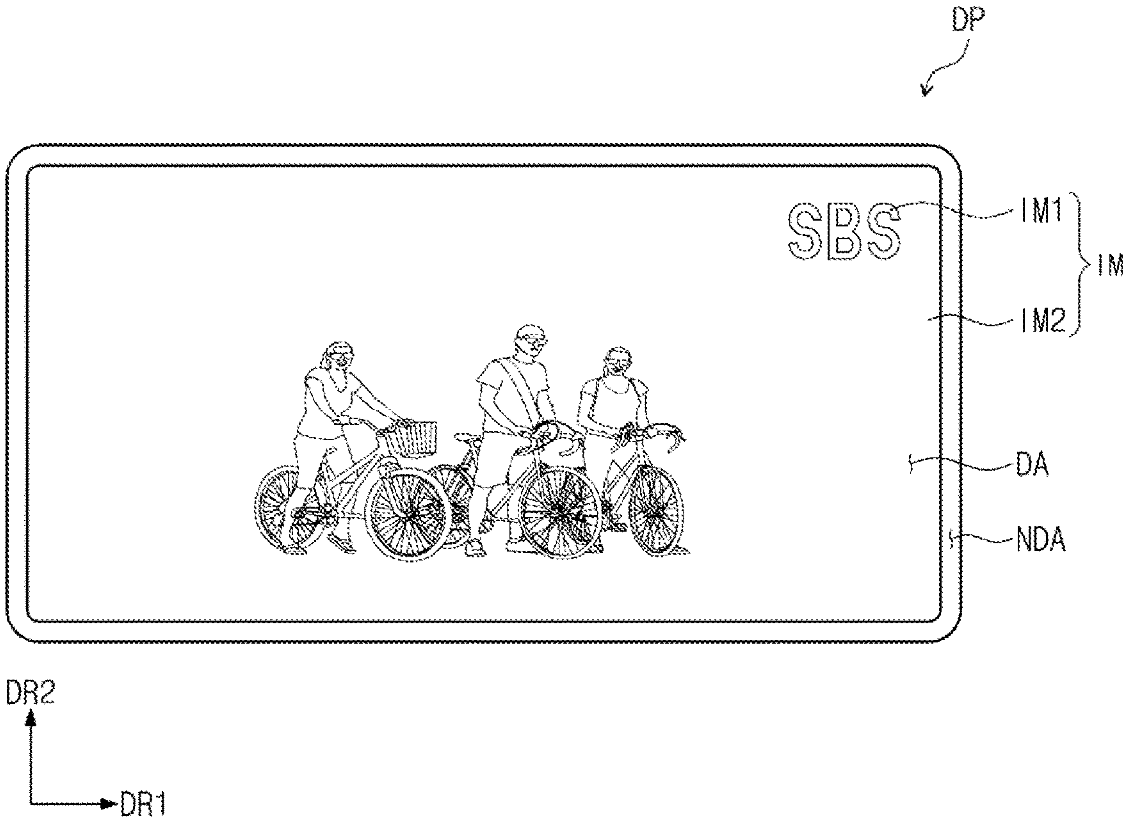
FIG. 4 is a plan view of an embodiment of the display panel of FIG. 1.

FIG. 1 is a block diagram of an embodiment of an electronic apparatus constructed according to the principles of the invention. FIG. 2 is a block diagram of an embodiment of the display device DD of FIG. 1. FIG. 3 is a waveform diagram showing illustrative frame data input to the display device DD of FIG. 2 in a variable frequency mode. FIG. 4 is a plan view of an embodiment of the display panel DP of FIG. 1.

Referring to FIG. 1, the electronic apparatus ED may include a host processor 10 and the display device DD. The display device DD may be a device that is configured to display an image, and the host processor 10 may control a driving of the display device DD. As an example, the host processor 10 may be a graphic processing unit (GPU). The host processor 10 may apply an input image signal I_DAT and an input control signal I_CS to the display device DD to control a display operation of the display device DD.

The display device DD may include the display panel DP, a controller 100, and a panel driver 200. The display device DD may be a device that is activated in response to electrical signals. The display device DD may be applied to various electronic items, e.g., a tablet computer, a notebook computer, a computer, a television set, a smartphone, or the like.

The controller 100 may receive the input image signal I_DAT and the input control signal I_CS from the host processor 10. The input image signal I_DAT may include a red image signal, a green image signal, and a blue image signal. The controller 100 may convert the data format of the input image signal I_DAT to generate image data RGB. The generated image data RGB may be provided to the panel driver 200. The input control signal I_CS may include a vertical synchronization signal Vsync (refer to FIG. 3), a data enable signal DE (refer to FIG. 3), a master clock signal, and the like, however, the embodiments should not be limited thereto or thereby. The controller 100 may generate a panel control signal based on the input control signal I_CS.

The controller 100 may be operated in a variable frequency mode. FIG. 3 is a waveform diagram showing frame data input to the display device DD of FIG. 2 in a variable frequency mode. Referring to FIGS. 1 and 3, the host processor 10 may change the duration of a blank period BP1 to BP6 in every frame and may apply the input image signal I_DAT to the controller 100 at a variable frame rate. The controller 100 that operates in the variable frequency mode may provide the image data RGB to the panel driver 200 in synchronization with the variable frame rate, and thus, may control the panel driver 200 so that the image is be displayed at the variable frame rate.

As shown in FIG. 3, the speed at which the host processor 10 renders frame data FD1 to FD7, that is, an internal processing speed, may not be substantially constant. The rendering speed may be changed depending on the frame data FD1 to FD7. For example, the host processor 10 may render first, second, fourth, sixth, and seventh frame data FD1, FD2, FD4, FD6, and FD7 at a frequency of about 144 Hz and may render third and fifth frame data FD3 and FD5 at a frequency of about 72 Hz. The time point at which the host processor 10 transmits the rendered frame data FD1 to FD7 to the controller 100 may be coincide with or may the a time point at which the rendering of corresponding frame data FD1 to FD7 is completed.

In a case where the second frame data FD2 are rendered at a frequency of about 144 Hz, the host processor 10 may provide the first frame data FD1 to the controller 100 at a frequency of about 144 Hz. The host processor 10 may provide the first frame data FD1 to the controller 100 during a first active period AP1 of a first frame FP1. The host processor 10 may provide the first frame data FD1 at a first frame rate in the first frame FP1.

In a case where the third frame data FD3 are rendered at a frequency of about 72 Hz, the host processor 10 may provide the second frame data FD2 to the controller 100 at a frequency of about 72 Hz. The host processor 10 may provide the second frame data FD2 to the controller 100 during a second active period AP2 of a second frame FP2, and a second blank period BP2 of the second frame FP2 may be maintained until the rendering of the third frame data FD3 is completed. That is, the host processor 10 may provide the second frame data FD2 at a second frame rate in the second frame FP2. As an example, the first frame rate may be about 144 Hz, and the second frame rate may be about 72 Hz.

In the illustrated embodiment, the duration of the first active period AP1 of the first frame FP1 and the duration of the second active period AP2 of the second frame FP2 may be substantially the same as each other. That is, active periods AP1 to AP7 may have a substantially constant duration in every frame regardless of the frame rate. However, the duration of a first blank period BP1 of the first frame FP1 and the duration of the second blank period BP2 of the second frame FP2 may be different from each other. As an example, the duration of the second blank period BP2 may be greater than the duration of the first blank period BP1. That is, the blank periods BP1 to BP6 in every frame FP1 to FP6 may have different durations depending on the frame rate. When the frame rate decreases, the duration of the corresponding blank period may increase. As described above, a mode in which the durations of the blank periods BP1 to BP6 are varied depending on the frame rate is referred to as the variable frequency mode, and the blank periods BP1 to BP6 having different durations from each other are referred to as variable blank periods. In every frame FP1 to FP6, each of the variable blank periods BP1 to BP6 may occur after a corresponding active period among the active periods AP1 to AP6. In the variable frequency mode, the host processor 10 may provide the input image signal I_DAT to the display device DD at irregular periods or irregular frequencies.

The active periods AP1 to AP6 of the frames FP1 to FP6 are defined as active periods of the data enable signal DE, and the blank periods BP1 to BP6 of the frames FP1 to FP6 are defined as non-active periods of the data enable signal DE. In the variable frequency mode, durations of the active periods of the data enable signal DE may be substantially constant regardless of the frame rate. Durations of the non-active periods of the data enable signal DE may be variable depending on the frame rate. The vertical synchronization signal Vsync may be activated at a start time point of every frame FP1 to FP6. Depending on the frame rate, an active period of the vertical synchronization signal Vsync may also be variable.

Referring to FIG. 2, the panel driver 200 may include a scan driver 210 and a data driver 220. The panel control signal may include a scan control signal SCS to control a driving of the scan driver 210 and a data control signal DCS to control a driving of the data driver 220.

The scan driver 210 may receive the scan control signal SCS from the controller 100. The scan control signal SCS may include a vertical start signal, which starts an operation of the scan driver 210, and a vertical clock signal. The scan driver 210 may generate a plurality of scan signals SS and may sequentially output the scan signals SS to scan lines described below. In addition, the scan driver 210 may generate a plurality of emission control signals in response to the scan control signal SCS and may output the emission control signals to a plurality of emission control lines EML1 to EMLn described below.

According to the illustrated embodiment, the scan driver 210 may include an initialization scan driver, a compensation scan driver, a write scan driver, and a black scan driver. The initialization scan driver outputs initialization scan signals to initialization scan lines GIL1 to GILn of the display panel DP, and the compensation scan driver outputs compensation scan signals to compensation scan lines GWL1 to GWLn of the display panel DP. The initialization scan driver and the compensation scan driver may be configured as independent circuits, respectively, or may be integrated into one circuit. When the initialization scan driver and the compensation scan driver are integrated into one circuit, the initialization scan signals may be defined as previous scan signals, and the compensation scan signals may be defined as current scan signals.

The write scan driver outputs write scan signals to write scan lines GDL1 to GDLn of the display panel DP, and the black scan driver outputs black scan signals to black scan lines GBL1 to GBLn of the display panel DP. The write scan driver and the black scan driver may be configured as independent circuits, respectively, or may be integrated into one circuit. When the write scan driver and the black scan driver are integrated into one circuit, the write scan signals may be defined as current scan signals, and the black scan signals may be defined as next scan signals.

In addition, FIG. 2 shows a structure in which the scan lines and the emission control lines are connected to one scan driver 210, however, the embodiments should not be limited thereto or thereby. According to another embodiment of the invention, a scan driver 210 that is connected to the scan lines and an emission driver that is connected to the emission control lines may be provided as separate components.

The scan driver 210 may be built in the display panel DP. That is, the scan driver 210 may be formed in the display panel DP through a thin film process that forms pixels PX11 to PXnm of the display panel DP.

The data driver 220 receives the data control signal DCS and the image data RGB from the controller 100. The data driver 220 converts the image data RGB to data signals DS and outputs the data signals DS to a plurality of data lines DL1 to DLm described below. The data signals DS may be analog voltages corresponding to grayscale values of the image data RGB.

The display device DD further includes a voltage generator to generate voltages that are required for the operation of the display device DD. In the illustrated embodiment, the voltage generator may generate a first power supply voltage ELVDD, a second power supply voltage ELVSS, and an initialization voltage Vint.

The display panel DP may include components that substantially generate the image IM. As an example, the display panel DP may be an organic light emitting display panel. The display panel DP includes the scan lines, the data lines DL1 to DLm, and the pixels PX11 to PXnm. The scan lines extend in a first direction DR1 and are spaced apart from each other in a second direction DR2. The data lines DL1 to DLm extend in the second direction DR2 and are spaced apart from each other in the first direction DR1. As an example, the scan lines include the initialization scan lines GIL1 to GILn, the compensation scan lines GWL1 to GWLn, the write scan lines GDL1 to GDLn, and the black scan lines GBL1 to GBLn.

Each of the pixels PX11 to PXnm is connected to a corresponding data line and a corresponding scan line. For example, a first pixel PX11 among the pixels PX11 to PXnm is connected to a first data line DL1, a first initialization scan line GIL1, a first compensation scan line GWL1, a first write scan line GDL1, and a first black scan line GBL1. A last pixel PXnm among the pixels PX11 to PXnm is connected an m-th data line DLm, an n-th initialization scan line GILn, an n-th compensation scan line GWLn, an n-th write scan line GDLn, and an n-th black scan line GBLn. That is, according to an example, each of the pixels PX11 to PXnm may be connected to four types of scan lines. However, the type of scan lines connected to each of the pixels PX11 to PXnm should not be limited thereby or thereto. That is, two or three types of scan lines may be connected to each of the pixels PX11 to PXnm.

The first power supply voltage ELVDD, the second power supply voltage ELVSS, and the initialization voltage Vint may be supplied to the display panel DP. Each of the pixels PX11 to PXnm may receive the first power supply voltage ELVDD, the second power supply voltage ELVSS, and the initialization voltage Vint.

Each of the pixels PX11 to PXnm includes a light emitting element and a pixel circuit unit that controls an emission of the light emitting element. As an example, the light emitting element may be an organic light emitting diode.

Referring to FIG. 4, the display panel DP includes a display area DA through which the image IM is displayed and a non-display area NDA adjacent to the display area DA. The display area DA is an area through which the image IM is displayed, and the non-display area NDA is a bezel area through which the image IM is not displayed. FIG. 4 shows a structure in which the non-display area NDA is disposed to surround the display area DA, however, the embodiments should not be limited thereto or thereby. The non-display area NDA may be adjacent to at least one side of the display area DA.

The image IM may be displayed through the display area DA. The image IM may include a first image IM1 and a second image IM2. The first image IM1 may be an image that is displayed at a fixed position for a predetermined time or longer in a specific gray level. The first image IM1 may be a still image, and the second image may be a video or a still image. For example, the first image IM1 may include a broadcaster logo, subtitles, date, time, and the like. The first image IM1 may include a title of a program. Hereinafter, for the convenience of explanation, all various images that are displayed at a fixed position for a predetermined time or longer in a specific gray level will be referred to as the first image IM1. The second image IM2 may be an image that is displayed through the other area of the display area DA except an area through which the first image IM1 is displayed.

The organic light emitting diode includes a plurality of electrodes and a light emitting layer disposed between the electrodes and including an organic material. When an area of the display area DA through which the first image IM1 is displayed is referred to as a first area, pixels in the first area may be burnt out due to the first image IM1 being displayed through the same pixels for a long time. Accordingly, when an image different from the first image IM1 is displayed through the first area after the first image IM1 is displayed through the first area, the first image IM1 may remain in the first area, which is not intended, and this persistent first image IM1 phenomena is called "image sticking." The controller 100 may periodically perform an image shift operation to compensate for the image sticking.

Figure 5:
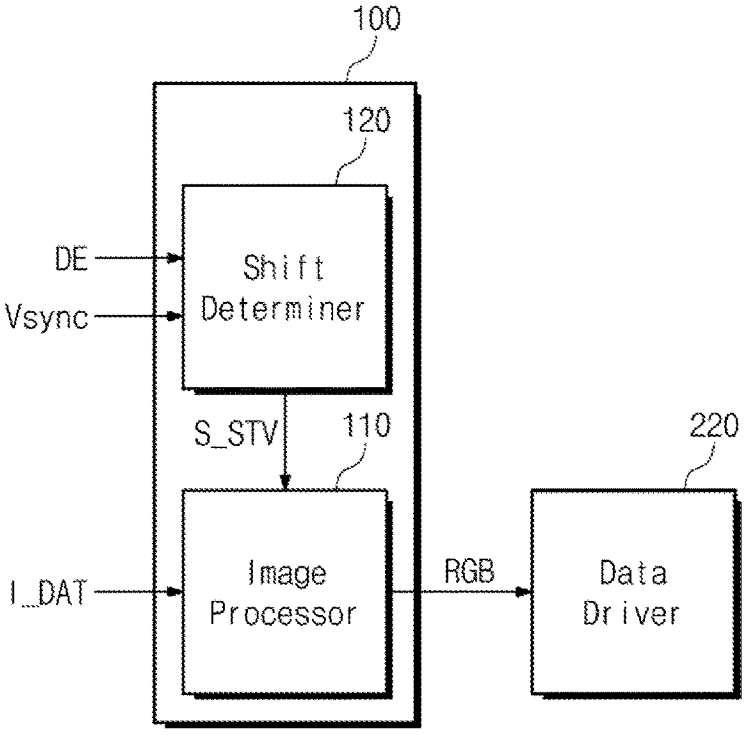
FIG. 5 is a block diagram of an embodiment of the controller of FIG. 2.
Figure 6:
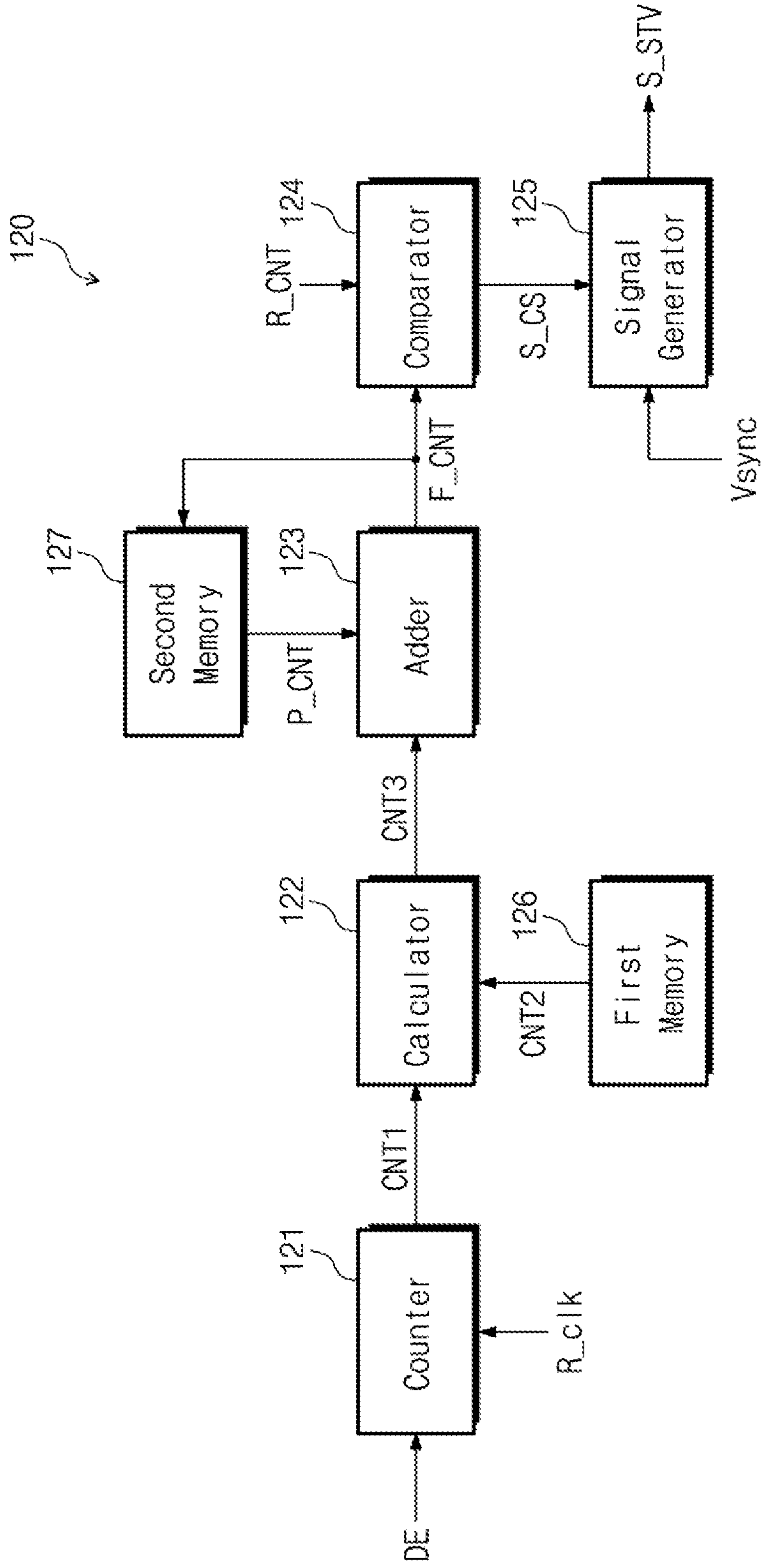
FIG. 6 is a block diagram of an embodiment of the shift determiner of FIG. 5.
Figure 7A:
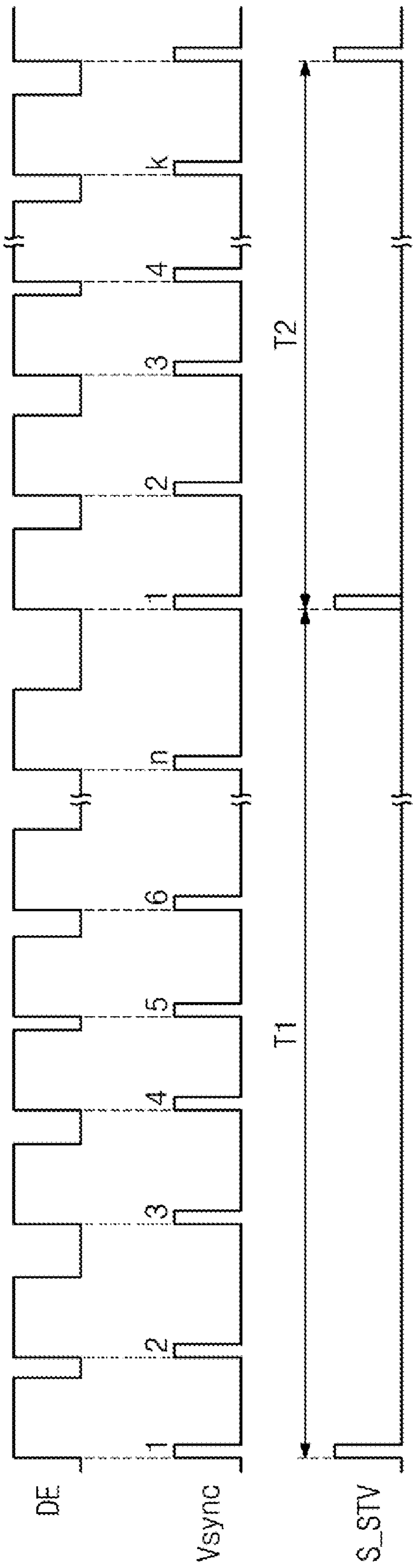
FIG. 7A is an illustrative waveform diagram showing a relation between a vertical synchronization signal and a shift start signal as input and output signals of the signal generator of FIG. 6.
Figure 7B:
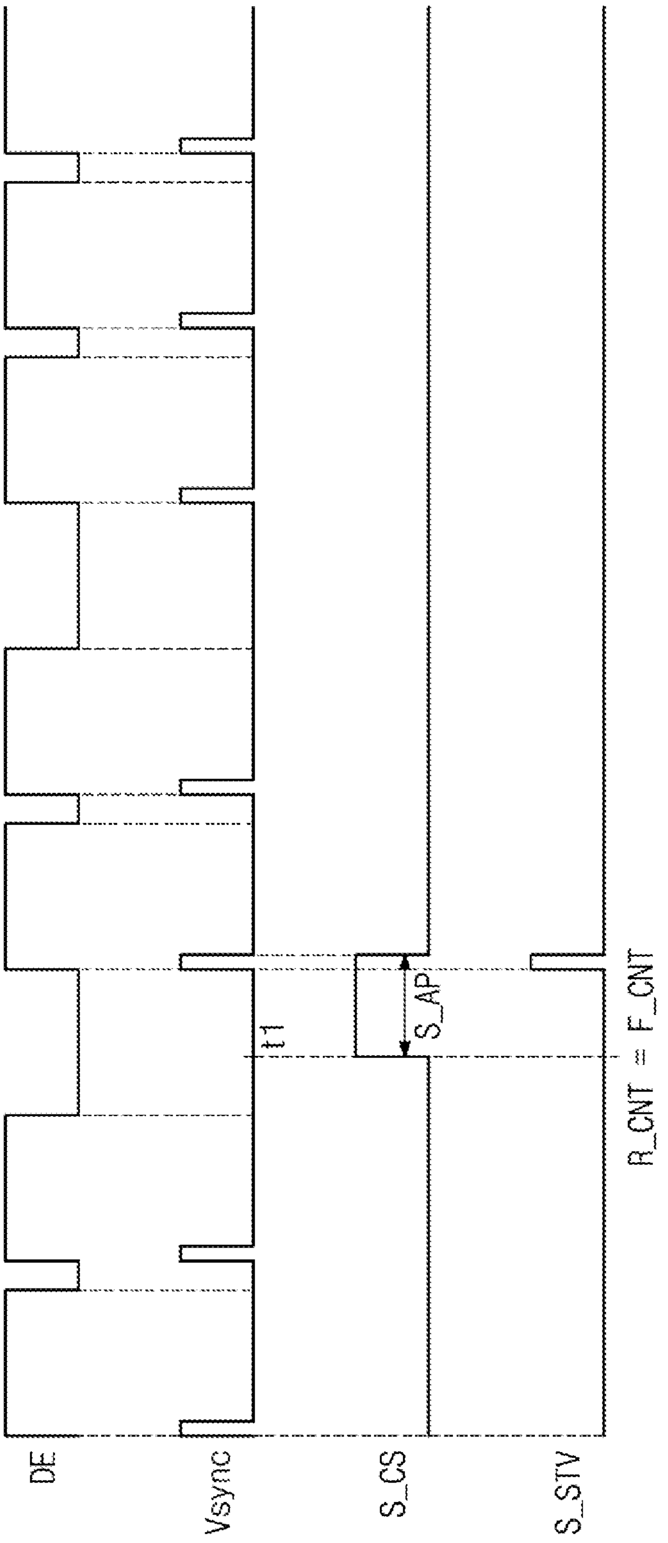
FIG. 7B is an illustrative waveform diagram showing an activation time point of the shift start signal and a shift control signal as output and input signals of the signal generator of FIG. 6.

FIG. 5 is a block diagram of an embodiment of the controller 100 of FIG. 2, and FIG. 6 is a block diagram of an embodiment of the shift determiner 120 of FIG. 5. FIG. 7A is an illustrative waveform diagram showing a relation between a vertical synchronization signal and a shift start signal as input and output signals of the signal generator of FIG. 6, and FIG. 7B is an illustrative waveform diagram showing an activation time point of the shift start signal and a shift control signal as input and output signals of the signal generator of FIG. 6.

Referring to FIGS. 3 and 5, the controller 100 may include a first circuit in the form of an image processor 110 and a second circuit in the form of a shift determiner 120. The image processor 110 may receive the input image signal I_DAT from the host processor 10 of FIG. 1. For example, referring to FIG. 3, the input image signal I_DAT may include the frame data FD1 to FD6 received in each of the frames FP1 to FP6. Each of the frames FP1 to FP6 may include a corresponding active period among the active periods AP1 to AP6 and a corresponding variable blank period among the variable blank periods BP1 to BP6.

The image processor 110 may convert the input image signal I_DAT to the image data RGB and may provide the image data RGB to the panel driver 200 of FIG. 1. As an example, the image processor 110 may perform the image shift operation in response to the shift start signal S_STV. The image processor 110 may shift the frame data FD1 to FD6 during several frames from the time point at which the shift start signal S_STV is activated and may output the shifted frame data as the image data RGB. The image processor 110 may shift a position of the frame data FD1 to FD6 in the first and second directions DR1 and DR2 of the display panel DP (refer to FIG. 2) or in a third direction different from the first and second directions DR1 and DR2 by at least one pixel during several frames.

The shift determiner 120 may count the duration of the variable blank period BP1 to BP6 in each frame FP1 to FP6 and may determine the activation time point of the shift start signal S_STV. That is, the shift start signal S_STV may be activated in association with the duration of the variable blank periods BP1 to BP6. The shift determiner 120 may receive the data enable signal DE and the vertical synchronization signal Vsync to generate the shift start signal S_STV.

Referring to FIGS. 6, 7A, and 7B, the shift determiner 120 may include a counter 121, a calculator 122, an adder 123, a comparator 124, and a signal generator 125.

The counter 121 may count the variable blank periods BP1 to BP6 (refer to FIG. 3) based on a reference clock R_clk and may output a first count value CNT1. The counter 121 may receive the reference clock R_clk and the data enable signal DE to count the variable blank periods BP1 to BP6. The counter 121 may count the number of occurrences of the reference clock R_clk during a time period from a start time point of the non-active period BP1 of the data enable signal DE of the first frame FP1, e.g., a current frame, to a start time point of the active period AP2 of the data enable signal DE of the second frame FP2, e.g., a next frame.

The first count value CNT1 output from the counter 121 may be provided to the calculator 122. The calculator 122 may add the first count value CNT1 and a pre-stored second count value CNT2 of the active period and may calculate a count value CNT3 in every frame. Since the active periods AP1 to AP7 of the frames have substantially constant duration, the second count value CNT2 may have a fixed value. The shift determiner 120 may further include a first memory 126 in which the second count value CNT2 is stored. However, the embodiments should not be limited thereto or thereby. That is, the first memory 126 may be provided as a separate component outside of the shift determiner 120.

The adder 123 may receive the count value CNT3 from the calculator 122. The adder 123 may add the count value CNT3 and a previous cumulative value P_CNT and may output a cumulative value F_CNT. The shift determiner 120 may further include a second memory 127 in which the cumulative value P_CNT is stored. The adder 123 may read out a cumulative value, i.e., the previous cumulative value P_CNT, up to a previous frame, e.g. the first frame FP1, from the second memory 127 and may add the count value CNT3 and the previous cumulative value P_CNT to calculate the cumulative value F_CNT of the present frame, e.g., the second frame FP2.

The second memory 127 may receive the cumulative value F_CNT of the current frame FP2, which is output from the adder 123, and may update the previous cumulative value P_CNT to the cumulative value F_CNT. FIG. 6 shows a structure in which the second memory 127 is disposed in the shift determiner 120, however, the embodiments should not be limited thereto or thereby. That is, the second memory 127 may be provided as a separate component outside the shift determiner 120.

The comparator 124 may compare the cumulative value F_CNT with a predetermined reference value R_CNT and may output the shift control signal S_CS according to the compared result. Specifically, when the cumulative value F_CNT is smaller than the reference value R_CNT, the comparator 124 may deactivate the shift control signal S_CS, and when the cumulative value F_CNT is equal to or greater than the reference value R_CNT, the comparator 124 may activate the shift control signal S_CS. For example, as shown in FIG. 7B, the shift control signal S_CS may be activated at a time point t1 at which the reference value R_CNT and the cumulative value F_CNT become the same.

The signal generator 125 may receive the vertical synchronization signal Vsync and may receive the shift control signal S_CS from the comparator 124. The signal generator 125 may generate the shift start signal S_STV based on the vertical synchronization signal Vsync in response to the shift control signal S_CS. The vertical synchronization signal Vsync may be generated in each frame according to the frame rate. Referring to FIG. 7B, the shift start signal S_STV may be generated in synchronization with the vertical synchronization signal Vsync during an active period S_AP of the shift control signal S_CS. The activated shift control signal S_CS may be deactivated in synchronization with a falling time point of the vertical synchronization signal Vsync. That is, the shift start signal S_STV may be activated in a period in which both the vertical synchronization signal Vsync and the shift control signal S_CS are activated and may be deactivated in a period in which at least one of the vertical synchronization signal Vsync and the shift control signal S_CS are deactivated.

The shift determiner 120 may control the activation time point of the shift start signal S_STV in association with the variable blank periods BP1 to BP6. Accordingly, the number of the active periods of the vertical synchronization signal Vsync included in each one of the periods of the shift start signal S_STV may be variable. For example, referring to FIG. 7A, the number of the active periods of the vertical synchronization signal Vsync included in an i-th period T1 of the shift start signal S_STV may be “n”, and the number of the active periods of the vertical synchronization signal Vsync included in a j-th period T2 of the shift start signal S_STV may be “k”. In this case, “n” and “k” may have an integer number equal to or greater than 1, and “n” and “k” may have different values from each other. The signal generator 125 may apply the shift start signal S_STV to the image processor 110, and the image processor 110 may start the image shift operation in response to the shift start signal S_STV. As an example, the active period of the shift start signal S_STV may be maintained during predetermined several frames in one period. In this case, the image processor 110 may not perform the image shift operation during the non-active period of the shift start signal S_STV and may perform the image shift operation during the active period of the shift start signal S_STV.

Figure 8:
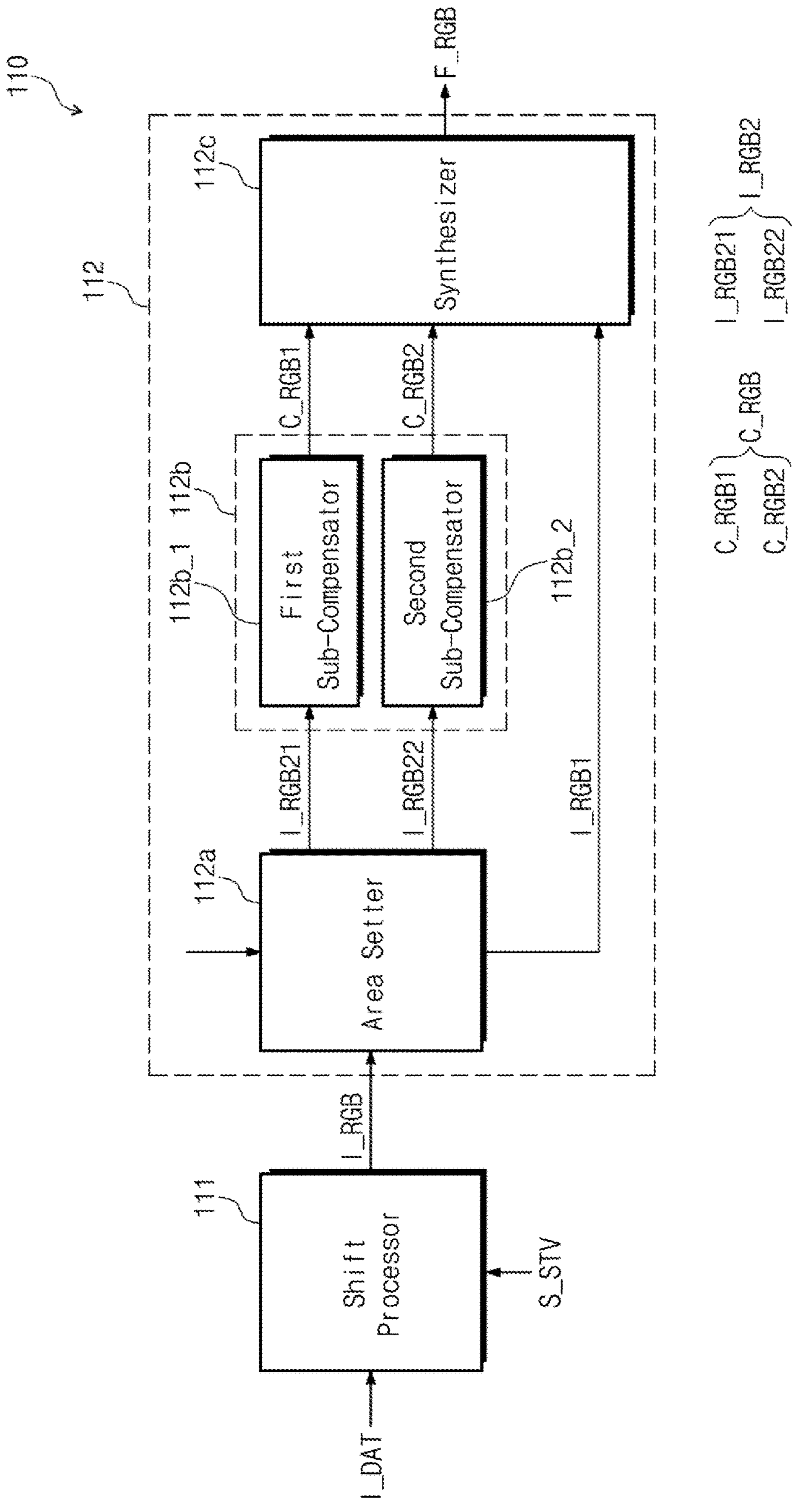
FIG. 8 is a block diagram of an embodiment of the image processor of FIG. 5.
Figure 9A:
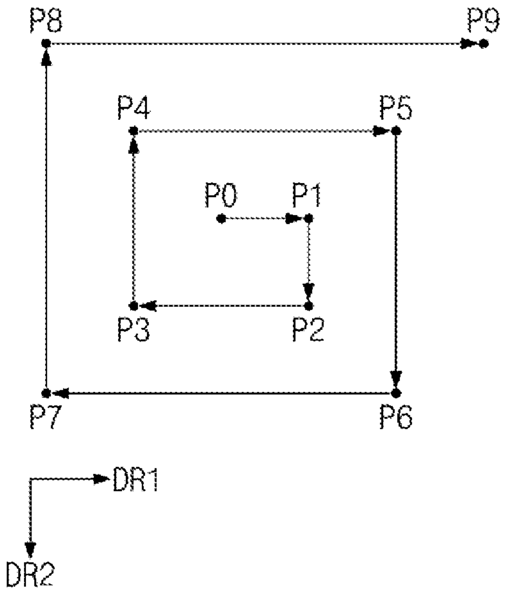
FIGS. 9A and 9B are views of embodiments of shift directions of an image according to the principles of the invention.
Figure 9B:
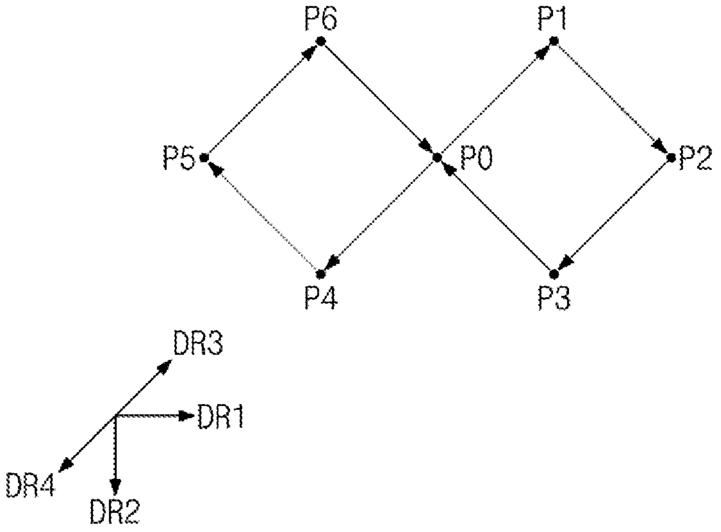
Figure 10:
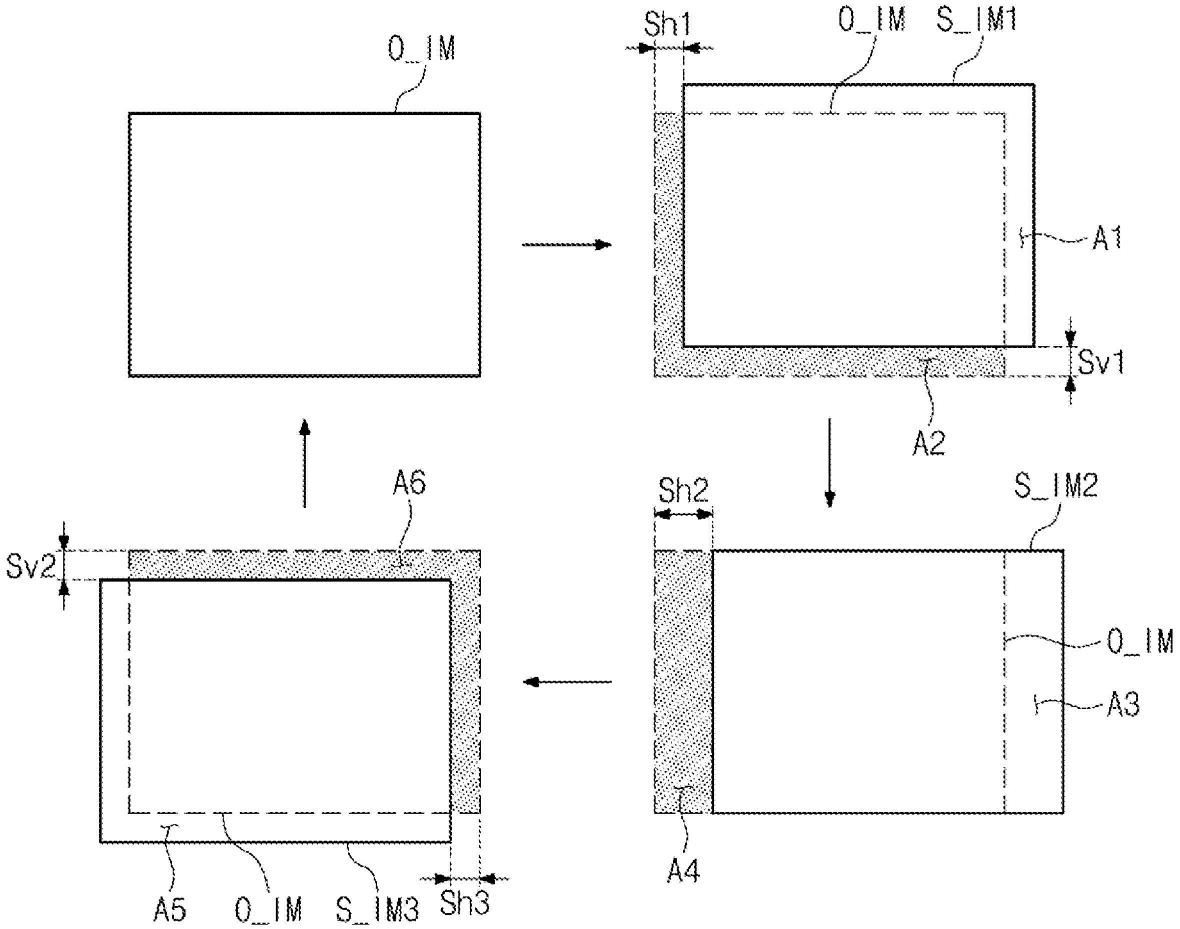
FIG. 10 is a view of an embodiment showing a pixel shift according to an image to shift operation by the image processor of FIG. 5.

FIG. 8 is a block diagram of an embodiment of the image processor 110 of FIG. 5, and FIGS. 9A and 9B are views of embodiments of shift directions of an image according to the principles of the invention. FIG. 10 is a view of an embodiment showing a pixel shift according to a shift direction of the image by the image processor of FIG. 5.

In the embodiment of FIG. 8, the image processor 110 includes a shift processor 111 and a data compensator 112.

The shift processor 111 performs the image shift operation on the input image signal I_DAT in response to the shift start signal S_STV. The shift processor 111 determines the pixel shift amount based on shift setting information and generates initial shift data I_RGB obtained by shifting the input image signal I_DAT according to the pixel shift amount and a shift direction.

The data compensator 112 compensates for the initial shift data I_RGB to generate final shift data F_RGB and outputs the final shift data F_RGB as the image data RGB (refer to FIG. 5). As an example, the data compensator 112 includes an area setter 112*a*, a compensator 112*b*, and a synthesizer 112*c*.

The area setter 112*a* may set a compensation area and a non-compensation area according to the pixel shift amount and the shift direction. As an example, the compensation area may include a first compensation area and a second compensation area. Among the initial shift data I_RGB, a first shift data I_RGB1 corresponding to the non-compensation area may be directly provided to the synthesizer 112*c* without passing through the compensator 112*b*.

A second shift data I_RGB2 corresponding to the compensation area may be provided to the compensator 112*b*. The compensator 112*b* may compensate for the second shift data I_RGB2 and may generate compensation data C_RGB. As an example, the second shift data I_RGB2 may include first sub-shift data I_RGB21 corresponding to the first compensation area and second sub-shift data I_RGB22 corresponding to the second compensation area. The first sub-shift data I_RGB21 may be provided to a first sub-compensator 112*b*_1, and the second sub-shift data I_RGB22 may be provided to a second sub-compensator 112*b*_2. The first sub-compensator 112*b*_1 may scale-up the first sub-shift data I_RGB21 to generate first compensation data C RGB1, and the second sub-compensator 112*b*_2 may scale-down the second sub-shift data I RGB22 to generate second compensation data C_RGB2.

The synthesizer 112*c* may receive the first shift data I_RGB1 from the area setter 112*a* and may receive the first and second compensation data C_RGB1 and C_RGB2 from the first and second sub-compensators 112*b*_1 and 112*b*_2. The synthesizer 112*c* may synthesize the first shift data I_RGB1 and the first and second compensation data C_RGB1 and C_RGB2 to generate the final shift data F_RGB. In the period where the image shift operation is performed, the final shift data F_RGB may be provided to the data driver 220 as the image data RGB.

Referring to FIGS. 9A and 9B, the image shift may be set in various ways. As shown in FIG. 9A, the image shift may be set to sequentially move to first to ninth positions P1 to P9 in a spiral type pattern from an original position P0 at which an original image corresponding to the input image signal I_DAT is displayed. The shift amount from each of the first to ninth positions P1 to P9 to the original position P0 may be defined as the pixel shift amount. The pixel shift amount may vary in the unit of at least one frame. The pixel shift amount may include at least one of a horizontal shift component and a vertical shift component. In a case where the original image is shifted from the original position P0 to the first position P1, the pixel shift amount may include only the horizontal shift component, and in a case where the original image is shifted from the original position P0 to a second position P2, the pixel shift amount may include the horizontal shift component and the vertical shift component. In this case, the horizontal shift component indicates the shift amount of the original image that moves in first direction DR1, and the vertical shift component indicates the shift amount of the original image that moves in the second direction DR2.

As shown in FIG. 9B, the image shift may be set to move one of first to sixth positions P1 to P6 in a FIG. 8 type pattern from the original position P0 at which the original image corresponding to the input image signal I_DAT is displayed.

For example, referring to FIGS. 8, 9B, and 10, after a first image shift operation is performed, an original image O_IM corresponding to the input image signal I_DAT may be shifted from an original position P0 to a first position P1. A first shift image S_IM1 corresponding to first shift data may be shifted to the third direction DR3 with respect to the original image O_IM. When the first image shift operation is performed, the pixel shift amount may include a first horizontal shift component Sh1 and a first vertical shift component Sv1.

In the first shift image S_IM1, an area (hereinafter, referred to as a "first area A1") that does not overlap the original image O_IM is a portion in which an actual image may not be displayed. In the original image O-IM, an area (hereinafter, referred to as a "second area A2") that does not overlap the first shift image S_IM1 is a portion in which there is no data to be displayed. Accordingly, the compensation operation, e.g., the scale-up or the scale-down, is performed based on data corresponding to overlap areas. Thus, data corresponding to the first area A1 are removed from the initial shift data I_RGB, data corresponding to the second area A2 are generated, and as a result, the final shift data F_RGB are completed.

After a second image shift operation is performed, the original image O_IM corresponding to the input image signal I_DAT may be shifted from the original position P0 to the second position P2. A second shift image S_IM2 corresponding to second shift data may be shifted to the first direction DR1 with respect to the original image O_IM. When the second image shift operation is performed, the pixel shift amount may include a second horizontal shift component Sh2. In the second shift image S_IM2, an area (hereinafter, referred to as a "third area A3") that does not overlap the original image O_IM is a portion in which an actual image may not be displayed. In the original image O_IM, an area (hereinafter, referred to as a "fourth area A4") that does not overlap the second shift image S_IM2 is a portion in which there is no data to be displayed. Accordingly, the compensation operation, e.g., the scale-up or the scale-down, is performed based on data corresponding to overlap areas. Thus, data corresponding to the third area A3 are removed from the initial shift data I_RGB, data corresponding to the fourth area A4 are generated, and as a result, the final shift data F_RGB are completed.

After a third image shift operation is performed, the original image O_IM corresponding to the input image signal I_DAT may be shifted to the third position P3 from the original position P0. A third shift image S_IM3 corresponding to third shift data may be shifted to a fourth direction DR4 with respect to the original image O_IM. When the third image shift operation is performed, the pixel shift amount may include a third horizontal shift component Sh3 and a second vertical shift component Sv2. In the third shift image S_IM3, an area (hereinafter, referred to as a "fifth area A5") that does not overlap the original image O_IM is a portion in which an actual image may not be displayed. In the original image O_IM, an area (hereinafter, referred to as a "sixth area A6") that does not overlap the third shift image S_IM3 is a portion in which there is no data to be displayed. Accordingly, the compensation operation, e.g., the scale-up or the scale-down, is performed based on data corresponding to overlap areas. Thus, data corresponding to the fifth area A5 are removed from the initial shift data I_RGB, data corresponding to the sixth area A6 are generated, and as a result, the final shift data F_RGB are completed.

The image shift operation performed using the image processor 110 (refer to FIG. 8) may be performed in various ways in addition to the embodiments shown in FIGS. 9A and 9B.

Figure 11:
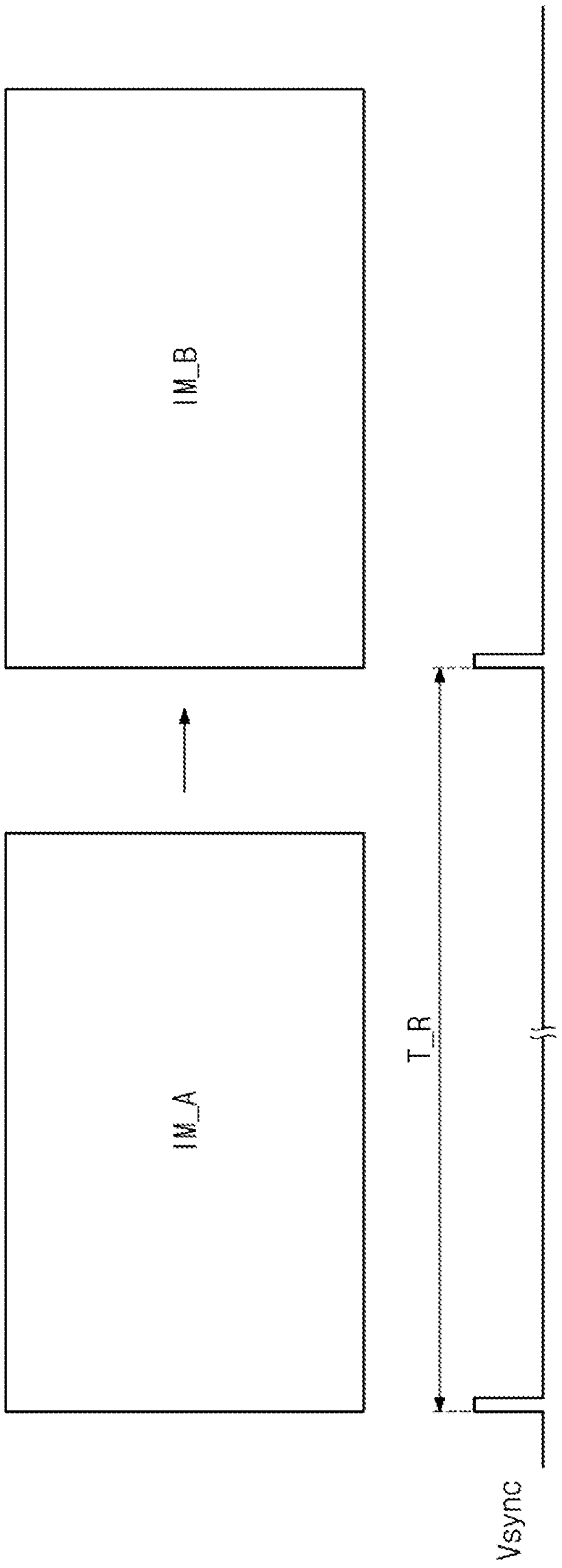
FIG. 11 is an illustrative waveform diagram showing a refresh operation of the display device operated in an ultra-low frequency mode.
Figure 12:
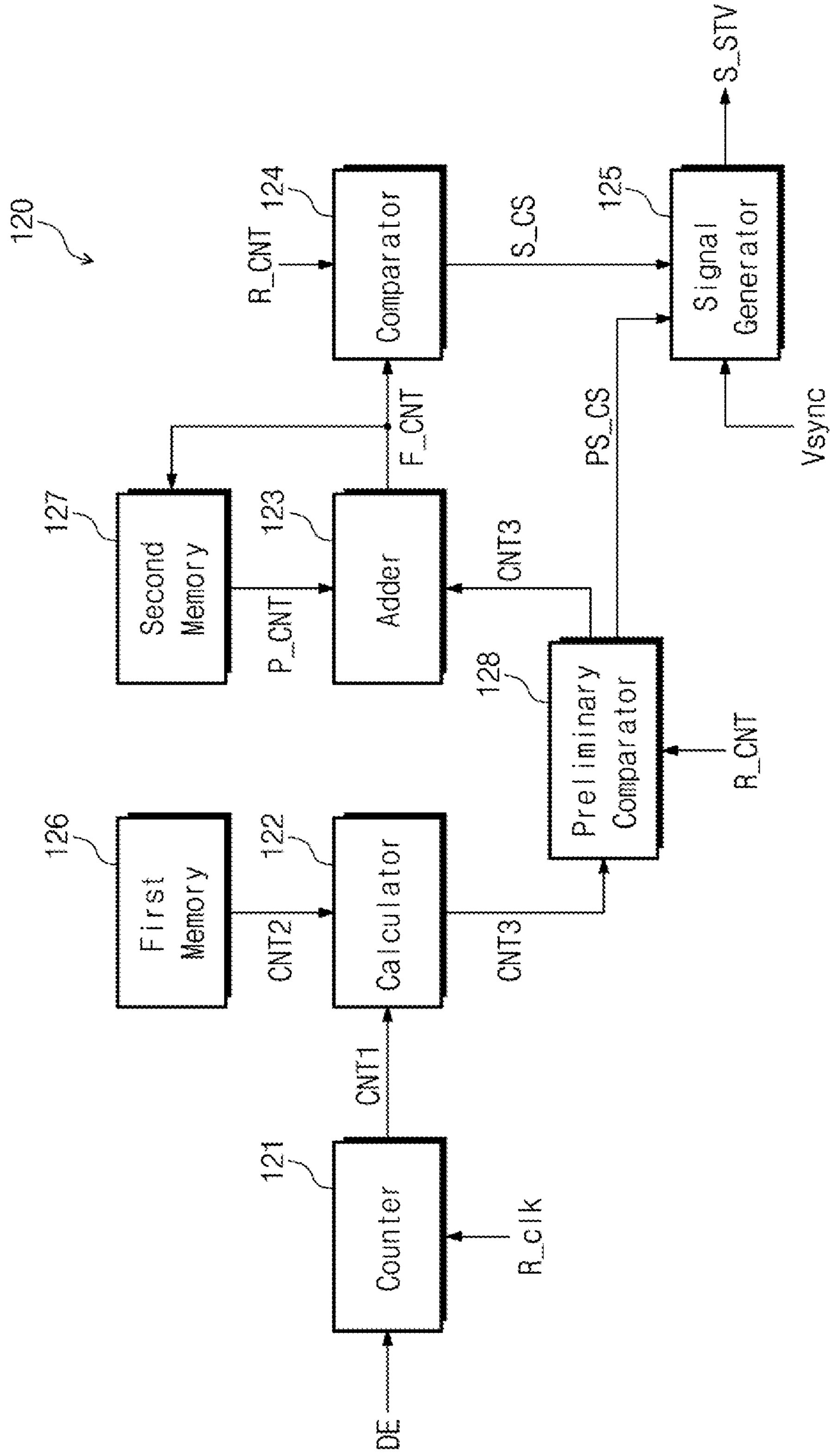
FIG. 12 is a block diagram of another embodiment of the shift determiner of FIG. 5.
Figure 13:
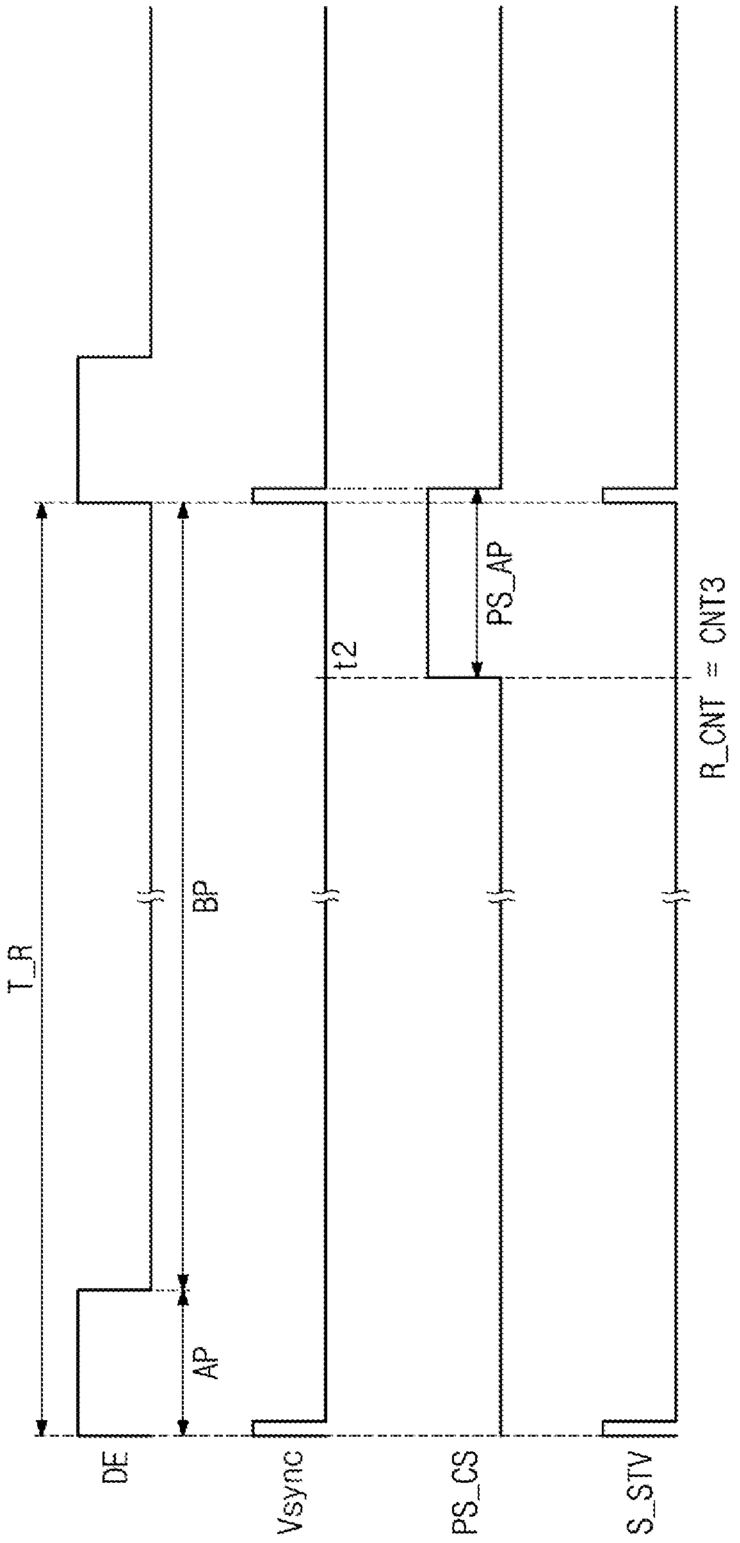
FIG. 13 is an illustrative waveform diagram showing an activation time point of a shift start signal and a pre-shift control signal as output and input signals of the signal generator of FIG. 12.

FIG. 11 is an illustrative waveform diagram showing a refresh operation of the display device operated in an ultra-low frequency mode. FIG. 12 is a block diagram of another embodiment of the shift determiner of FIG. 5. FIG. 13 is an illustrative waveform diagram showing an activation time point of a shift start signal and a pre-shift control signal as output and input signals of the signal generator of FIG. 12. In FIGS. 12 and 13, the same reference numerals denote the same elements used in FIGS. 6 and 7B, and thus, detailed descriptions of the same elements will be omitted to avoid redundancy.

The display device DD (refer to FIG. 1) operated in the ultra-low frequency mode may display a still image IM_A at a predetermined period T_R. For example, the display device DD may be operated at a frequency lower than about 1 Hz in the ultra-low frequency mode. In the ultra-low frequency mode, the period T_R at which the still image IM_A is refreshed to another image IM_B may be greater than a predetermined shift period.

Hereinafter, a method of performing the image shift operation at the predetermined period in the ultra-low frequency mode will be described.

In the embodiment of FIGS. 12 and 13, the shift determiner 120 further includes a preliminary comparator 128. The preliminary comparator 128 receives a count value CNT3 from a calculator 122 and compares the received count value CNT3 with a predetermined reference value R_CNT.

When the count value CNT3 is smaller than the reference value R_CNT, the preliminary comparator 128 provides the count value CNT3 to an adder 123. When the count value CNT3 is provided to the adder 123, the adder 123 and a comparator 124 may be operated similar to the adder 123 and the comparator 124 shown in FIGS. 6 and 7B. When the count value CNT3 is equal to or greater than the reference value R_CNT, the preliminary comparator 128 may activate a pre-shift control signal PS_CS. For example, as shown in FIG. 13, after a time point t2 at which the reference value R_CNT becomes the same as the count value CNT3, the pre-shift control signal PS_CS may be activated.

A signal generator 125 receives a vertical synchronization signal Vsync and receives the pre-shift control signal PS_CS from the preliminary comparator 128. The signal generator 125 generates a shift start signal S_STV based on the vertical synchronization signal Vsync in response to the pre-shift control signal PS_CS. The shift start signal S_STV may be generated in synchronization with the vertical synchronization signal Vsync in an active period PS_AP of the pre-shift control signal PS_CS. The activated pre-shift control signal PS_CS may be deactivated in synchronization with a falling time point of the vertical synchronization signal Vsync. That is, the shift start signal S_STV is activated in a period in which both the vertical synchronization signal Vsync and the pre-shift control signal PS_CS are activated. According to FIG. 13, the number of the active periods of the vertical synchronization signal Vsync included in one period of the shift start signal S_STV may be one. As an example, the active period of the shift start signal S_STV may be maintained in predetermined several frames.

The signal generator 125 may provide the shift start signal S_STV to the image processor 110 (refer to FIG. 5), and the image processor 110 may normally perform the image shift operation at a predetermined period in response to the shift start signal S_STV in the ultra-low frequency mode.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:

a display panel to display an image;

a panel driver to drive the display panel; and a controller to control driving of the panel driver, wherein the controller comprises a first circuit to receive frame data during an active period of a frame having the active period and a variable blank period, to shift a position of the frame data in response to a shift start signal to generate shift data, and to provide the shift data to the panel driver, and a second circuit to count the variable blank period based on a reference clock to generate a count value of the frame, to compare a cumulative value obtained by cumulating the count value with a predetermined reference value, and to determine the activation time point of the shift start signal according to the compared result.

2. The display device of claim 1, wherein the second circuit comprises a shift determiner including:

a counter to count a number of occurrences of the reference clock during the variable blank period to output a first count value; and a calculator to add a pre-stored second count value of the active period and the first count value to calculate the count value.

3. The display device of claim 2, wherein the active period has a substantially constant duration every frame, and the variable blank period has a variable duration.

4. The display device of claim 3, wherein the variable blank period is generated after the active period in the frame.

5. The display device of claim 2, wherein the controller is configured to receive the frame data in response to a data enable signal, and the counter is configured to count a non-active period of the data enable signal to generate the first count value.

6. The display device of claim 2, wherein the controller further comprises a first memory in which the second count value is stored.

7. The display device of claim 2, wherein the shift determiner further comprises:

an adder to add the count value and a previous cumulative value to output the cumulative value; and a comparator to compare the cumulative value with the reference value and to output a shift control signal according to the compared result.

8. The display device of claim 7, wherein the controller further comprises a second memory to receive the cumulative value output from the adder and to update the previous cumulative value to the cumulative value.

9. The display device of claim 7, wherein the shift determiner further comprises a signal generator to receive the shift control signal to control the activation time point of the shift start signal and to provide the shift start signal to the first circuit.

10. The display device of claim 7, wherein the shift determiner further comprises a preliminary comparator to compare the count value with the reference value.

11. The display device of claim 10, wherein the preliminary comparator is configured to provide the count value to the adder when the count value is less than the reference value and to output a pre-shift control signal when the count value is greater than the reference value.

12. The display device of claim 11, wherein the shift determiner further comprises a signal generator to receive the pre-shift control signal to control the activation time point of the shift start signal and to provide the shift start signal to the image processor.

13. The display device of claim 1, wherein the display panel comprises a plurality of pixels each comprising a light emitting element.

14. The display device of claim 13, wherein the first circuit comprises an image processor including:

a shift processor to determine a pixel shift amount based on shift setting information and to generate initial shift data obtained by shifting the frame data according to the pixel shift amount and a shift direction; and a data compensator to compensate for the initial shift data to generate the shift data.

15. The display device of claim 14, wherein the data compensator comprises:

an area setter to set first and second compensation areas according to the pixel shift amount and the shift direction;

a first sub-compensator to scale up first sub-shift data corresponding to the first compensation area among the initial shift data to generate first compensation data; and a second sub-compensator to scale down second sub-shift data corresponding to the second compensation area among the initial shift data to generate second compensation data.

16. A method of driving a display device, the method comprising:

receiving frame data during an active period of a frame having the active period and a variable blank period;

setting a period of a shift start signal based upon the variable blank period;

determining an activation time point of the shift start signal in association with a duration of the variable blank period;

shifting the frame data in response to the shift start signal to generate shift data;

converting the shift data to a data signal; and displaying an image using the data signal, wherein:

the setting the period of the shift start signal comprises counting the variable blank period based on a reference clock to generate a count value of the frame; and the determining the activation time point of the shift start signal comprises:

comparing a cumulative value obtained by cumulating the count value with a predetermined reference value; and determining the activation time point of the shift start signal according to the compared result.

17. The method of claim 16, wherein the determining the activation time point of the shift start signal comprises:

generating the count value of the frame;

adding the count value and a pre-stored previous cumulative value to generate the cumulative value;

comparing the cumulative value with the reference value to output a shift control signal according to the compares result; and activating the shift start signal in response to the shift control signal.

18. The method of claim 17, wherein the calculating the count value further comprises:

counting a number of occurrences of the reference clock during the variable blank period to output a first count value; and adding a pre-stored second count value of the active period and the first count value to calculate the count value.

19. The method of claim 18, wherein the active period has a substantially constant duration every frame, and the variable blank period has a variable duration.

20. The method of claim 19, wherein, in the frame, the variable blank period is generated after the active period.

21. The method of claim 18, wherein the receiving the frame data comprises receiving the frame data in response to a data enable signal, and the outputting the first count value comprises counting a non-active period of the data enable signal to generate the first count value.

22. The method of claim 18, further comprising:

receiving the count value; and updating the previous cumulative value to the cumulative value.

23. The method of claim 18, further comprising the count value with the reference value prior to the outputting of the cumulative value.

24. The method of claim 23, wherein the comparing the count value with the reference value comprises:

adding the count value and the previous cumulative value when the count value is less than the reference value; and outputting a pre-shift control signal when the count value is greater than the reference value.

25. The method of claim 24, further comprising activating the shift start signal in response to the pre-shift control signal.

26. The method of claim 16, wherein the generating the shift data comprises:

determining a pixel shift amount based on shift setting information to generate initial shift data obtained by shifting the frame data according to the pixel shift amount and a shift direction; and compensating for the initial shift data to generate the shift data.

27. The method of claim 26, wherein the compensating for the initial shift data comprises:

setting first and second compensation areas according to the pixel shift amount and the shift direction;

scaling up first sub-shift data corresponding to the first compensation area among the initial shift data to generate first compensation data; and scaling down second sub-shift data corresponding to the second compensation area among the initial shift data to generate second compensation data.

* * * * *